United States Patent [19]

Sung et al.

[11] Patent Number: 4,985,047
[45] Date of Patent: Jan. 15, 1991

[54] POLY(OXYBUTYLENE)POLY(OXYETHYLENE)DIAMINE COMPOUND AND ORI-INHIBITED MOTOR FUEL COMPOSITION

[75] Inventors: Rodney L. Sung, Fishkill; Daniel T. Daly, Brewster, both of N.Y.

[73] Assignee: Texaco Inc., White Plains, N.Y.

[21] Appl. No.: 440,638

[22] Filed: Nov. 24, 1989

[51] Int. Cl.$^5$ .............................................. C10L 1/22
[52] U.S. Cl. ........................................ 44/433; 44/459; 564/505; 525/409; 528/421
[58] Field of Search .................. 44/72, 62; 564/504, 564/505; 525/409; 528/421

[56] References Cited

U.S. PATENT DOCUMENTS

| | | | |
|---|---|---|---|
| 3,309,182 | 3/1967 | Crowley et al. | 44/72 |
| 3,531,527 | 9/1970 | Li | 564/505 |
| 3,654,370 | 4/1972 | Yeakey | 564/480 |
| 3,660,319 | 5/1972 | Yeakey | 564/505 |
| 4,742,168 | 5/1988 | Zimmerman | 564/505 |
| 4,747,851 | 5/1988 | Sung | 94/72 |
| 4,827,038 | 5/1989 | Larkin | 564/505 |

Primary Examiner—Olik Chaudhuri
Assistant Examiner—Jerry Johnson
Attorney, Agent, or Firm—Robert A. Kulason; James J. O'Loughlin; Robert B. Burns

[57] ABSTRACT

A novel oil-soluble polyether diamine compound, a concentrate comprising the compound dissolved in a hydrocarbon solvent, and a haze-free, deposit-resistant and ORI-inhibited motor fuel composition comprising the compound is described. Motor fuel compositions comprising the novel polyether diamine compound of the instant invention are haze-free and improve ORI control and carbonaceous deposit inhibition in motor fuels. Motor fuel compositions of the instant invention may optionally comprise a polyolefin polymer/copolymer component having a molecular weight range of about 500–3500.

15 Claims, No Drawings

POLY(OXYBUTYLENE)POLY(OXYETHYLENE)-DIAMINE COMPOUND AND ORI-INHIBITED MOTOR FUEL COMPOSITION

BACKGROUND OF THE INVENTION

1. Field of the Invention

This invention relates to a novel oil-soluble polyester diamine compound, to a concentrate comprising the polyether diamine dissolved in a hydrocarbon solvent, and to a haze-free, ORI-inhibited and deposit-resistant motor fuel composition comprising the polyether diamine. More particularly, this invention relates to: (i) a novel polyether diamine compound block copolymers; (ii) a concentrate comprising the novel polyether diamine dissolved in a hydrocarbon solvent; and (iii) a motor fuel composition comprising the novel polyether diamine. Motor fuel compositions comprising the polyoxyalkylene diamine of the instant invention are haze-free, ORI-inhibited and have a reduced tendency to form depostis. Motor fuel compositions of the instant invention may additionally comprise a polymer/copolymer component.

Combustion of a hydrocarbonaceous motor fuel in an internal combustion engine results in the formation and accumulation of deposits on various parts of the combustion chamber as well as on the fuel intake and exhaust systems of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs, which causes engine knock. In addition, the accumulation of deposits within the combustion chamber reduces the volume of the combustion zone, causing a higher than design compression ratio in the engine. This, in turn, also results in serious engine knocking. A knocking engine does not effectively utilize the energy of combustion. Moreover, a prolonged period of engine knocking will cause stress fatigue and wear in vital parts of the engine. The above-described phenomenon is characteristic of gasoline powered internal combustion engines. It is usually overcome by employing a higher octane gasoline for powering the engine, and hence has become known as the engine octane requirement increase (ORI) phenomenon. It would therefore be highly advantageous if engine ORI could be substantially reduced or eliminated by preventing deposit formation in the combustion chamber of the engine.

An additional problem common to internal combustion engines relates to the accumulation of deposits in the carburetor which tend to restrict the flow of air through the carburetor at idle and at low speed, resulting in an overrich fuel mixture. This condition also promotes incomplete fuel combustion and leads to rough engine idling and engine stalling. Excessive hydrocarbon and carbon monoxide exhaust emissions are also produced under these conditions. It would therefore be desirable from the standpoint of engine operability and overall air quality to provide a motor fuel composition which minimizes or overcomes the above described problems.

Deposit-inhibiting additives for use in motor fuel compositions are well known in the art. However, conventional additives may cause hazing of the motor fuel. Hazy motor fuels are unacceptable by the public since they may indicate a problem with the fuel, such as the presence of undesired contaminants. It would therefore be desirable to provide a haze-free motor fuel composition which is deposit-resistant and ORI-inhibited.

The instant invention discloses a novel gasoline-soluble polyether diamine compound which, when employed in a motor fuel composition, minimizes the tendency of the motor fuel to form deposits. Consequently, engine ORI is substantially reduced by employing the polyether diamine of the instant invention in motor fuel compositions. Motor fuel compositions of the instant invention are also haze-free, clear, and stable.

2. Disclosure Statement

Co-assigned U.S. patent applications Ser. No. 000,230, filed Jan. 1, 1987, discloses a novel gasoline-soluble reaction product and the use of the reaction product as an ORI-inhibitor in motor fuel compositions. The novel reaction product is obtained by reacting:

(i) about 1 mole of a dibasic acid anhydride:
(ii) 1–2 moles of a polyoxyalkylene diamine, and
(iii) 1–2 moles of a hydrocarbyl polyamine.

Co-assigned U.S. Pat. No. 4,581,040 teaches the use of a reaction product as a deposit inhibitor additive in fuel compositions. The reaction product taught is a condensate product of the process comprising:

(i) reacting a dibasic acid anhydride with a polyoxyisopropylenediamine of the formula

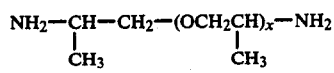

where x is a numeral of about 2–50, therby forming a maleamic acid;
(ii) reacting said maleamic acid with a polyalkylene polyamine, thereby forming a condensate product; and
(iii) recovering said condensate product.

Co-assigned U.S. Pat. No. 4,659,336, filed on Mar. 28, 1986 discloses the use of the mixture of: (i) the reaction product of maleic anhydride, a polyether polyamine containing oxyethylene and oxypropylene ether moieties, and a hydrocarbyl polyamine; and (ii) a polyolefin polymer/copolymer as an additive in motor fuel compositions to reduce engine ORI.

Co-assigned U.S. Pat. No. 4,659,337, filed on Jan. 23, 1986 discloses the use of the reaction product maleic anhydride, a polyether polyamine containing oxyethylene and oxypropylene ether moieties, and a hydrocarbyl polyamine in a gasoline motor fuel to reduce engine ORI and provide carburetor detergency.

U.S. Pat. No. 4,604,103 discloses a motor fuel deposit control additive for use in internal combustion engines which maintains cleanliness of the engine intake system without contributing to combustion is a hydrocarbyl polyoxyalkylene polyamine ethane of molecular weight range 300–2500 having the formula:

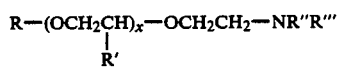

where R is a hydrocarbyl radical of from 1 to about 30 carbon atoms; R' is selected from methyl and ethyl; x is an integer from 5 to 30; and R" and R'" are independently selected from hydrogen and (CH2CH2NH )yH' where y is an integer from 0-5.

U.S. Pat. No.4,357,148 discloses the use of the combination of an oil-soluble aliphatic polyamine component containing at least one olefinic polymer chain and having a molecular weight range of 600-10,000, and a polymeric component which may be a polymer, copolymer, hydrogenated polymer or copolymer, or mixtures thereof having a molecular weight range of 500-1500 to reduce or inhibit ORI in motor fuels.

U.S. Pat. No. 4,191,537 discloses the use of a hydrocarbyl polyoxyalkylene aminocarbonate, having a molecular weight range of 600-10,000 and also having at least one basic nitrogen atom per aminocarbonate molecule, to reduce and control ORI in motor fuels.

Co-assigned U.S. Pat. No. 3,502,451 discloses the use of C2-C6 polyolefin polymers or hydrogenated polymers having a molecular weight range 500-3500 in motor fuels to eliminate or reduce deposition on the intake valves and ports of an internal combustion engine.

U.S. Pat. No. 3,438,757 discloses the use of branched chain aliphatic hydrocarbyl amines and polyamines having molecular weights in the range 425-10,000 to provide detergency and dispersancy in motor fuels.

Co-assigned Rep. of SOuth Africa Application No. 731911, filed on Mar. 19, 1973, discloses a motor fuel composition comprising a polymeric component which is a polymer or copolymer of a C2-C6 unsaturated hydrocarbon having a molecular weight in the range 500-3500, and a hydrocarbyl-substituted amine or polyamine component, said motor fuel composition having effectiveness in reducing engine intake valve and port deposits.

Co-assigned U.S. Pat. No. 4,316,991 discloses a modified polyol compound having a molecular weight range of 2000-7000, produced by reacting an initiator having an active hydrogen functionality of 3-4, one or more alkylene oxides, and an epoxy resin.

U.S. Pat. No. 3,654,370 discloses a method of preparing polyoxyalkylene polyamines by treating the corresponding polyoxyalkylene polyol with ammonia and hydrogen over a catalyst prepared by the reduction of a mixture of nickel, copper, and chromium oxides. The polyoxyalkylene polyamines formed are of the formula:

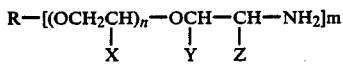

wherein R is the nucleus of an oxyalkylation-susceptible polyhydric alcohol containing 2-12 carbon atoms and 2-8 hydroxyl groups, Z is an alkyl group containing 1-18 carbon atoms, X and Y are hydrogen or Z, n has an average value of 0-50 and m is an integer of 2-8 corresponding to the number of hydroxyl groups in the polyhydric alcohol.

U.S. Pat. No. 3,535,307 discloses the preparation of high molecular weight polyether block copolymers the sequential alkoxylation of a polyfunctional initiator with alkylene epoxide components.

Co-assigned U.S. Pat. No. 4,747,851 discloses polyoxyalkylene diamine compounds and ORI-inhibited motor fuel composition containing same.

SUMMARY OF THE INVENTION

The present invention relates to novel diamine containing block copolymers with polyether backbones useful for inhibiting carbonaceous deposit formation, motor fuel hazing, and as an ORI inhibitor when employed as a soluble additive in a motor fuel composition. The novel polyether diamine compound of the instant invention is obtained by first preparing a polyol precursor by reacting a polyethylene glycol with ethylene oxide, and butylene oxide, and thereafter catalytically aminating the polyol with ammonia and hydrogen over a nickel-chromium-copper metal and metal oxide catalyst to produce a novel polyoxyalkylene diamine of the formula:

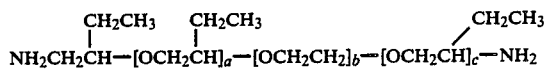

where b has a value from about 10-80, preferably 20-60, and a+c has a value from about 10-50, preferably 20-40.

The instant invention is also directed to a concentrate comprising 1.0-75.0 weight percent, preferably 5.0-35.0 weight percent of the prescribed novel polyether diamine dissolved in a hydrocarbon solvent, preferably xylene. In addition, the instant invention is directed to a haze-free, deposit-resistant and ORI-inhibited motor fuel composition comprising 0.0005-1.0 weight percent, preferably 0.001-0.5, most preferably 0.01-0.1 weight percent of the prescribed reaction product. An additional polymer/copolymer additive with a molecular weight range of 500-3500, preferably 650-2600 may also be employed in admixture with the motor fuel composition of the instant invention in concentrations of 0.001-1.0 weight percent, preferably 0.01-0.5 weight percent.

DETAILED EMBODIMENTS OF THE INVENTION

The novel polyether diamine compound of the instant invention is a diamine of the formula:

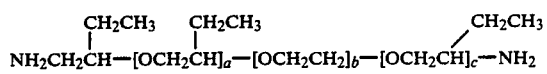

where b has a value from about 10-80, preferably 20,60 and a+c has a value from about 10-50, preferably 20-40. The novelty of the prescribed polyether diamine compound resides in the unique structure of the compound not heretofore disclosed.

The novel polyether diamine of the instant invention is obtained by first preparing a polyol precursor, and thereafter catalytically aminating the polyol to produce the polyether diamine. The polyol precursor is prepared by reacting a polyethylene glycol of an approximate molecular weight of 100-3000, preferably about 600, with an aqueous alkali metal hydroxide, preferably potassium hydroxide. The reactor is then supplied with a nitrogen gas purge and heated to about 95°-120° C., preferably about 100° C., and dried of water. Ethylene oxide is then charged in to the reactor and reacted at a temperature of 95°-120° C., preferably about 50 psig. Without digestion, butylene oxide is then charged in to the reactor and reacted at a temperature of 95°-120° C., preferably 105°-110° C., and a pressure of 10-100 psig, preferably about 50 psig.

After allowing for a digestion period, the alkaline polyol reaction product is neutralized with magnesium silicate, which may be added to the reaction mixture as a solid or as an aqueous solution. A magnesium silicate particularly suitable for use in neutralizing the alkaline polyol is MAGNESOL 30/40, commercially available from Reagent Chemical and Research Inc. After neutralization, di-t-butyl-p-cresol is added to stabilize the polyol, and the polyol is thereafter stripped and filtered to yield the final polyol precursor compound.

Amination of the above-described polyol precursor is accomplished as follows. A tubular reactor is filled with a nickel-chromium-copper metal and metal oxide catalyst. Such a catalyst is described, for example, in U.S. Pat. No. 3,654,370, incorporated herein by reference. The reactor is heated to a temperature of 190°-220° C., preferable about 200° C., and a pressure of 500-4000 psig, preferably about 2000 psig. The polyol precursor is fed into the reactor at a flow rate of about 0.1-1.0, preferably about 0.6 g/cc-cat/hr. Ammonia is fed into the reactor at a rate of about 0.2-6.0, preferable about 12 lb/1 b-polyol. Hydrogen is fed into the reactor at a flow rate of about 1-10, preferably about 2 SCF/lb-polyol. The effluent is then stripped at about 85°-175° C., preferably about 100° C., and 0.1-150 mm Hg, preferably abut 10 mm Hg vacuum, to obtain the novel polyether diamine of the instant invention. The best mode of synthesis of the prescribed novel polyether diamine compound of the instant invention is set forth in Example I, below.

EXAMPLE I

Synthesis of Novel Polyether Diamine Reactant

A. Preparation of Polyol Precursor

Ten pounds of a polyethylene glycol of an approximate molecular weight of 600 and 100 g of 45% aqueous KOH is charged into a ten-gallon reactor, which is then purged with prepurified nitrogen. While maintaining a nitrogen purge, the reactor is heated to 100° C., and an initiator is then dried to a water content of less than 0.1% by vacuum stripping followed by nitrogen stripping. Thereafter, 19 lb of ethylene oxide is charged and reacted at 105°-110 C. and 50 psig for 1.25 hours. Without digestion, 33 lbs of butylene oxide is then charged and reacted at 110-120° C. and 50 psig over a 3 hour period.

After a 2 hour digestion period, the alkaline polyol is neutralized by stirring for 2 hours with about 360 g of MAGNESOL 30/40, which is added as an aqueous slurry. To stabilize the material, about 26.4 g of di-t-butly p-cresol is added. The neutralized product is then vacuum stripped to about 5 mm Hg pressure, nitrogen stripped, and filtered. The finished product will be generally characterized by the following representative properties:

| Acid no., mg KOH/g | 0.01 |
|---|---|
| Hydroxyl no., mg KOH/g | 35 |
| Water, wt % | 0.01 |
| pH in 10:6 isopropanol-water | 8.1 |
| Color, Pt-Co | 40 |
| Sodium, ppm | 0.2 |
| Potassium, ppm | 0.2 |
| Peroxide, ppm | 1.1 |
| Viscosity, °F., cc | |
| 77 | 988 |
| 100 | 513 |

B. Amination Reaction 0.6 lb/hr of the polyol prepared under A,, 1.2 lb/hr of ammonia, and 36 liter/hr of hydrogen are fed into a 1250 ml tubular reactor filled with a nickel-chromium-copper metal and metal oxide catalyst which is kept at 200° C. and 2000 psig. The reactor effluent is stripped at 100° C. and 10 mm Hg vacuum. The resulting polyether polyamine product will be generally characterized by the following representative properties:

| Total acetylatables, meq/g | 0.615 |
|---|---|
| Total amine, meq/g | 0.56 |
| Primary amine, meq/g | 0.54 |
| Water, wt % | 0.09 |
| Color, Pt-Co | 30 |
| Flash Point, PMCC | 440° F. |
| Melting point, °C. | 27-31 |

A critical feature of the novel olyether diamine compound of the instant invention is the presence of a large number (10-50 preferably 20-40) of polyoxybutylene ether moieties. In particular, the presence of a large number of polyoxybutylene ether moieties enhances the gasoline solubility of the compound, thus increasing its efficiency as an additive in motor fuel compositions. The novel polyether diamine compound of the invention requires no admixing with a solvent prior to introduction into a base motor fuel composition.

The motor fuel composition of the instant invention comprises a major amount of a base motor fuel and 0.0005-1.0 weight percent, preferably 0.001-0.5, most preferably 0.01-0.2 weight percent of the above-described novel polyether diamine. Preferred base motor fuel compositions for use with the polyether diamine additive are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chain or branched chain paraffins, cyclopar-affins, olefins, aromatic hydrocarbons, or mixtures thereof. The base fuel can be derived from, among others, straight run naphtha, polymer gasoline, natural gasoline, or from catalytically reformed stock. The composition and octane level of the base fuel are not critical and any conventional motor fuel base can be employed in the practice of this invention. In addition, the motor fuel composition may contain any of the additives generally employed in gasoline. Thus, the fuel composition can contain anti-knock compounds such as tetraethyl lead compounds, anti-icing additives, upper cylinder lubricating oils, and the like.

The motor fuel composition of the instant invention may additionally comprise a polymeric component, present in a concentration ranging from about 0.001-1.00 weight percent, preferably 0.01-0.5 weight percent, based on the total weight of the motor fuel composition. The polymeric component may be a polyolefin polymer, copolymer, or corresponding hydrogenated polymer or copolymer of a $C_2$-$C_6$ unsaturated hydrocarbon. The polymer component is prepared from monoolefins and diolefins, or copolymers thereof, having an average molecular weight range from about 500-3500, preferably about 650-2600. Mixtures of olefin polymers with an average molecular weight within the foregoing range are also effective. In general, the olefin monomers from which the polyolefin polymer component is prepared are unsaturated $C_2$-$C_6$ hydrocarbons. Specific olefins which may be employed to prepare the polyolefin polymer component include ethylene, propylene, isopropylene, butylene, isobutylene, amylene and hexylene. Propylene, isopropylene, butylene and isobutylene are particularly preferred for use in preparing the polyolfin component. Other polyolefins which may be employed are those prepared by cracking polyolefin polymers or copolymers of high molecular weight to a polymer in the above-noted molecular weight to a polymer in the above-noted molecular weight range. Derivatives of the noted polymers obtained by saturating the polymers by hydrogenation are also effective. The word "polymers" is intended to include the polyolefin polymers and their corresponding hydrogenated derivatives. The average molecular weight range of the polymer component is important. The polyolefin polymer, copolymer, or corresponding hydrogenated polymer or copolymer component may have an average molecular weight in the range from about 500–3500, preferably from about 650–2600. The most preferred polymer components for use in the instant invention are polypropylene with an average molecular weight in the range of about 750–1000, preferably about 800, and polyisobutylene with an average molecular weight in the range of about 1000–1500, preferably about 1300. The polymer component, if employed, enhances the ORI reduction of the instant invention, and additionally provides enhanced cleanliness at the engine intake valves and ports.

The motor fuel compositions of the instant invention are surprisingly effective in minimizing and reducing the ORI of a gasoline internal combustion engine. This improvement may be demonstrated in engine tests where the performance characteristics of a base motor fuel composition containing a commercial fuel additive and the improved motor fuel compositions of the instant invention are compared.

A base motor fuel suitable for the tests (herein designated as Base Fuel A) is a premium grade gasoline essentially unleaded (less than 0.05 g of tetraethyl lead per gallon), and comprising a mixture of hydrocarbons boiling in the gasoline boiling range consisting of about 22% aromatic hydrocarbons, 11% olefinic hydrocarbons, boiling in the range from about 90° F. to 450° F. In preparing motor fuels for an engine test, a suitable amount of the novel polyether diamine compound of the instant invention is added directly to Base Fuel A without any additional solvents being necessary.

The specific engine test suitable for determining engine ORI is made on a 1.8 liter Chevrolet four cylinder engine. This test correlates well with results obtained via road simulation tests. The engine test employs a 1.8 liter Chevrolet in-line four cylinder engine with a cast alloy iron cylinder head having separate intake and exhaust ports for each cylinder. An electronically controlled fuel injection system maintains the required fuel flow to each engine cylinder by monitoring various engine operating parameters (e.g. manifold absolute pressure, throttle valve position, coolant temperature, engine r.p.m., and exhaust gas oxygen content) and adjusting the fuel flow accordingly. The fuel system supplying fuel to the engine is specifically adapted for the determination of engine ORI. At the beginning of the engine rating procedure, a fuel with an octane rating high enough to ensure that no audible engine knock is present is employed. The next lower octane fuel is then switched with the previous fuel, and this procedure continues until a knock becomes audible. The difference between the octane level at knock and no-knock conditions is the engine ORI Engine ORI is determined as a function of hours of engine operation.

Example II, set forth below, is illustrative of the ORI phenomenon exhibited by a conventional motor fuel composition.

EXAMPLE II

The ORI tendencies of Base Fuel A containing 60 PTB of a commercial fuel additive (60 pounds of additive per 1000 barrels of gasoline, equivalent to about 0.02 weight percent of additive based upon the weight of the fuel composition) were measured using the above-described Chevrolet 1.8 liter engine. After about 225 hours of engine operation, the motor fuel composition of Base Fuel A containing 60 PTB of commercial fuel additive exhibited an ORI of 8–9 octane numbers.

The addition of an effective amount of the prescribed polyether diamine of the invention in a motor fuel composition will modify or reduce the ORI build up in an engine.

For convenience in shipping and handling, it is useful to prepare a concentrate of the novel polyoxyalkylene diamine compound which may be added to a base motor fuel to produce the motor fuel composition of the instant invention. The concentrate may be prepared in a suitable liquid solvent containing from about 1.0–75.0 weight percent, preferably 5.0–35.0 weight percent of the additive component or components: namely, the above-described novel polyoyalkylene diamine compound either alone or in combination with the above-described additional polymer component. Suitable solvents for use in the concentrate include hydrocarbon solvents such as toluene and xylene, with xylene being preferred.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A polyether diamine compound of the formula:

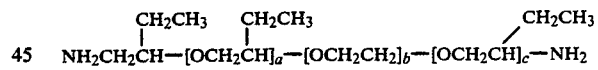

where b has a value from about 10–80 and a+c has a value from about 12 to 40.

2. A compound as set forth in claim 1, wherein b has a value of about 20–60 and a+c has a value from about 20 to 40.

3. A concentrate composition comprising 1.0–75.0 weight percent of a polyoxyalkylene diamine of the formula:

in admixture with a hydrocarbon solvent, where b has a value from about 10 to 80 and a+c has a value from about 12 to 40.

4. A concentrate composition according to claim 3, wherein b has a value from about 20 to 60 and a+c has a value from about 20 to 40.

5. A concentrate composition according to claims 3 or 4, where said polyether diamine is present in a concentration range of 5.0–35.0 weight percent.

6. A motor fuel composition comprising a mixture of hydrocarbons boiling in the range from about 90° F.–450° F. and from 0.0005–1.0 weight percent of a polyether diamine of the formula:

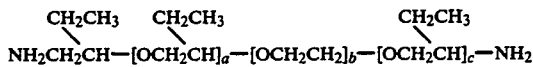

where b has a value from about 10–80 and a+c has a value from about 12 to 40.

7. A motor fuel composition according to claim 6, wherein b has a value from about 20 to 60 and a+c has a value from about 20 to 40.

8. A motor fuel composition according to claim 6, comprising from about 0.001–0.5 weight percent of said polyether diamine additive.

9. A motor fuel composition according to claim 7, comprising from about 0.01–0.2 weight percent of said polyether diamine additive.

10. A motor fuel composition according to claim 6, which additionally comprises from about 0.001–1.0 weight percent of a polyolefin polymer, copolymer, or the corresponding hydrogenated polymer, or copolymer, or mixtures thereof, of a C2–C6 unsaturated hydrocarbon, said polyolefin polymer or copolymer having a molecular weight in the range from about 500–3500.

11. A motor fuel composition according to claim 10, in which said polyolefin polymer or copolymer component is derived from an unsaturated hydrocarbon selected from the group consisting of ethylene, propylene, isopropylene, butylene, isobutylene, amylene, hexylene, isoprene, and butadiene.

12. A motor fuel composition according to claim 11, in which said polyolefin polymer, copolymer, or corresponding hydrogenated polymer or copolymer component has a molecular weight in the range of about 650–2600.

13. A motor fuel composition according to claim 12, in which said polyolefin polymer component is a polypropylene having a molecular weight in the range of about 750–1000.

14. A motor fuel composition according to claim 13, where said polyolefin polymer component is a polypropylene with an average molecular weight of about 800.

15. A motor fuel composition according to claim 12, in which said polyolefin polymer component is a polyisobutylene having a molecular weight in the range of about 1000–1500.

* * * * *